United States Patent [19]
Katada

[11] Patent Number: 6,038,290
[45] Date of Patent: Mar. 14, 2000

[54] SELECTIVE CALLING RECEIVER WITH CALL NUMBER TRANSFER CAPABILITY

[75] Inventor: Nobuyuki Katada, Shizuoka, Japan

[73] Assignee: NEC Corporation, Tokyo, Japan

[21] Appl. No.: 08/906,971

[22] Filed: Aug. 6, 1997

[30] Foreign Application Priority Data

Aug. 12, 1996 [JP] Japan ................................. 8-212722

[51] Int. Cl.⁷ .................................................. H04Q 7/20
[52] U.S. Cl. .................. 379/56.3; 455/31.3; 340/825.44
[58] Field of Search ................... 379/56.1–56.3; 455/31.2–31.3; 340/825.44, 311.1

[56] References Cited

U.S. PATENT DOCUMENTS

| H1772 | 1/1999 | Akahane | 379/56.3 X |
|---|---|---|---|
| 4,757,553 | 7/1988 | Crimmins | 379/56.3 X |
| 4,845,491 | 7/1989 | Fascenda et al. | 340/825.44 |
| 5,224,150 | 6/1993 | Neustein | 455/31.2 |
| 5,513,241 | 4/1996 | Dimitriadis et al. | 379/56.3 X |
| 5,524,276 | 6/1996 | Littig et al. | 455/418 |
| 5,745,850 | 4/1998 | Aldermeshian et al. | 455/417 |
| 5,907,418 | 5/1999 | Walczak et al. | 455/403 X |

FOREIGN PATENT DOCUMENTS

| 7-274229 | 10/1995 | Japan . |
|---|---|---|
| 8-9440 | 1/1996 | Japan . |
| 2 283 599 | 5/1995 | United Kingdom . |
| 2 304 247 | 3/1997 | United Kingdom . |

Primary Examiner—William G. Trost
Attorney, Agent, or Firm—Young & Thompson

[57] ABSTRACT

A call number of a selective calling receiver stored in an ID-ROM is ready by an ID number reading portion to be sent from an infrared ray outputting portion as an infrared ray signal. An infrared ray signal given from a further selective calling receiver is converted into an electric signal by an infrared ray sensor and its call number is detected from the electric signal by an ID number detecting portion to be additionally registered in the ID-ROM.

5 Claims, 7 Drawing Sheets

SELECTIVE CALLING RECEIVER WITH CALL NUMBER TRANSFER CAPABILITY

BACKGROUND OF THE INVENTION

1. Field of the Invention

The present invention relates to an individual selective calling receiver.

2. Description of the Related Art

Individual selective calling receivers are capable of being called by a telephone and the like, receiving a message therefrom, and displaying the received message. Individual selective calling receivers of this kind are structured to be capable of receiving a message only in case a selective call signal is coincident with the ID numbers or telephone numbers assigned to the respective individual selective calling receivers.

However, the conventional individual selective calling receivers mentioned in the above have the following problems.

First, a problem arises when one calling party would like to call a plurality of users of individual selective calling receivers. In this case, the respective individual selective calling receivers of people to be called have different ID numbers or telephone numbers. Therefore, it is necessary for the calling party to carry out call operation a plurality of times, which is troublesome.

Secondly, another problem arises when a calling party himself would like to confirm a message that he sent. Even if he himself has an individual selecting calling receiver, he can not receive and confirm the message that he sent. This is because the ID number or telephone number of the individual selective calling receiver that a calling party has is different from the ID number or telephone number of an individual selective calling receiver to which he sent the message.

SUMMARY OF THE INVENTION

Accordingly, an object of the present invention is to solve the problems mentioned in the above and to provide an improved individual selective calling receiver.

Another object of the present invention is to provide an individual selective calling receiver capable of sending a message to a plurality of individual selective calling receivers with the call operation thereof being carried out only once.

Still another object of the present invention is to provide an individual selective calling receiver with which a calling party can receive and confirm a message that he himself has sent.

Yet another object of the present invention is to provide a combined individual selective calling receiver in order to attain the above-mentioned objects.

An individual selective calling receiver according to the present invention is structured by an ID number reading portion for reading and outputting ID number or telephone number information stored in an ID-ROM, an infrared ray outputting portion for converting an electric signal as output of the ID number reading portion into an infrared ray signal and outputting the infrared ray signal, an infrared ray sensor for converting an infrared ray into an electric signal and outputting the electric signal, and an ID number detecting portion for detecting ID number and telephone number information from output of the infrared ray sensor.

According to an individual selective calling receiver of the present invention, by sending and receiving an ID number or telephone number utilizing an infrared ray, the ID number or telephone number can be copied. By utilizing the copying, the same ID number or telephone number can be registered in a plurality of individual selective calling receivers and all of the receivers can be simultaneously called. Further, a user who sent a message can confirm the message that he sent with an individual selective calling receiver of his own.

BRIEF DESCRIPTION OF THE DRAWINGS

These and other objects, features and advantages of this invention will become more fully apparent from the following detailed description taken with the accompanying drawings in which.

In the drawings, the same reference numerals denote the same structural elements.

DESCRIPTION OF THE PREFERRED EMBODIMENTS

A preferred embodiment of the present invention is now described in detail with reference to the drawings.

Figure 1:
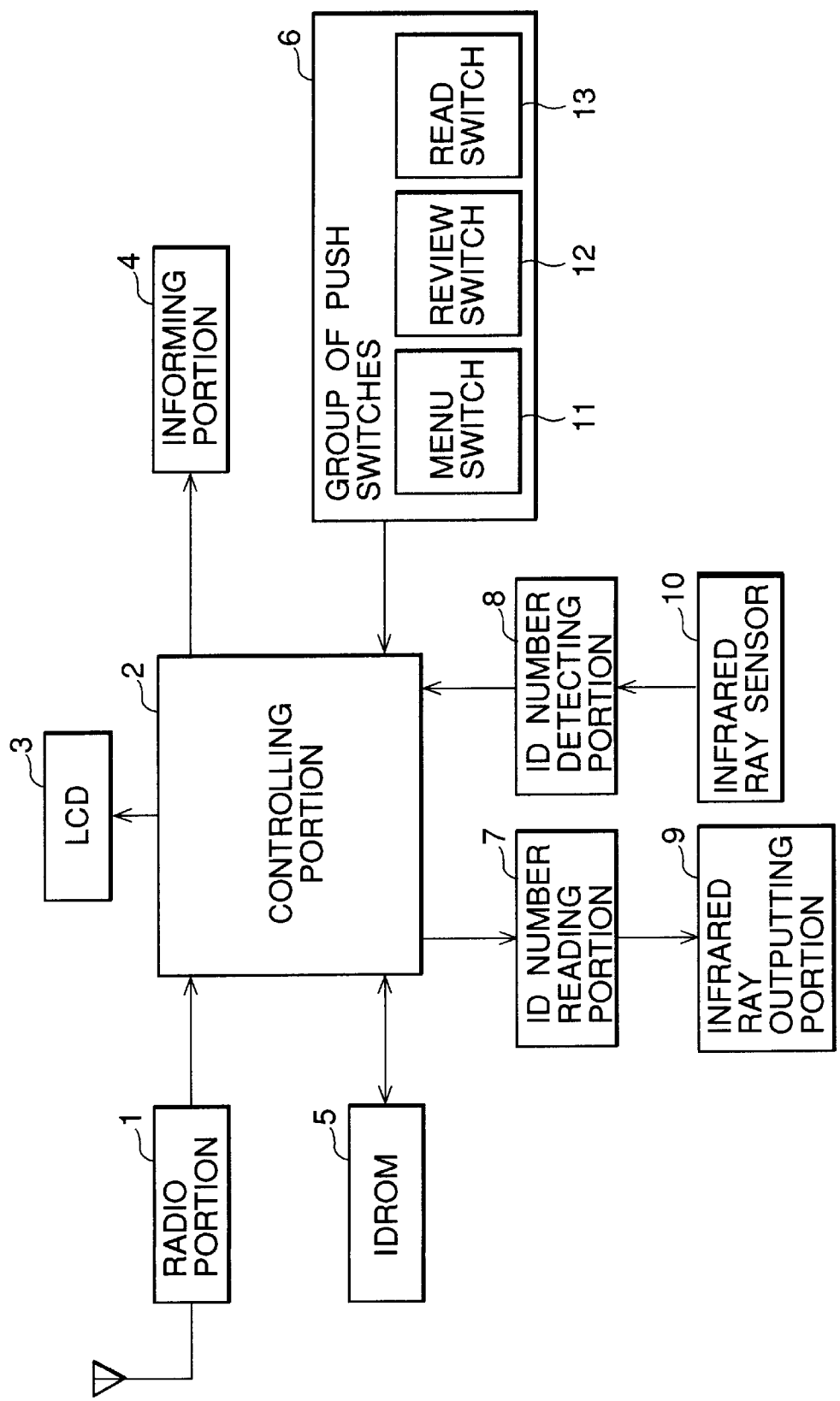
FIG. 1 is a block diagram illustrating a structure of an individual selective calling receiver according to one preferred embodiment of the present invention.

FIG. 1 is a block diagram illustrating a structure of an individual selective calling receiver according to one preferred embodiment of the present invention.

In FIG. 1, a radio portion 1 is a means for receiving via an antenna and demodulating a radio signal sent from a base station which is not shown. A controlling portion 2 is a means for processing data received by the radio portion 1. The controlling portion 2 is also a means for controlling respective portions of the individual selective calling receiver. An LCD (liquid crystal display) 3 is a means for displaying a received message. An informing portion 4 is a means for informing the user that a message is received. An ID-ROM 5 is a means for storing an ID number set in advance in the individual selective calling receiver. The ID-ROM 5 is preferably not a read-only type but a writable nonvolatile memory. A group 6 of push switches are formed of various switches for displaying a received message and for selecting various modes to be set.

The above are structural elements necessary to function as an ordinary individual selective calling receiver. The individual selective calling receiver according to the present embodiment has, in addition to the above, the following characteristic structural elements. First, an ID number reading portion 7 is a means for reading an ID number or telephone number in the ID-ROM 5 and for outputting it as an electric signal. An infrared ray outputting portion 9 converts an electric signal outputted by the ID number reading portion 7 into an infrared ray signal and outputs the infrared ray signal. An infrared ray sensor 10 converts an infrared ray sent toward the individual selective calling receiver into an electric signal and outputs the electric signal. An ID number detecting portion 8 detects an ID number or telephone number from an electric signal outputted by the infrared ray sensor 10.

Figure 2A:
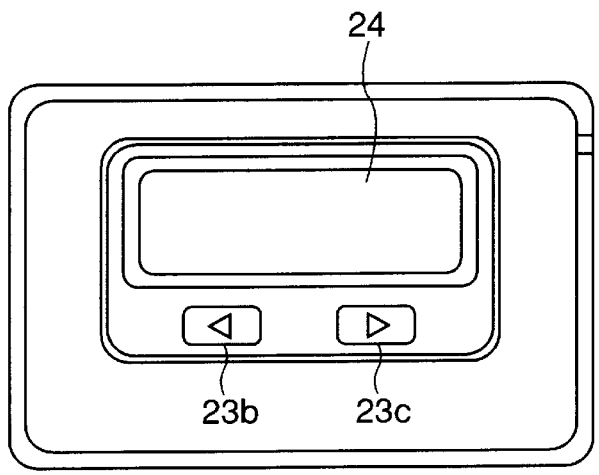
FIGS. 2A and 2B illustrate a structure of the appearance of the individual selective calling receiver shown in FIG. 1.
Figure 2B:
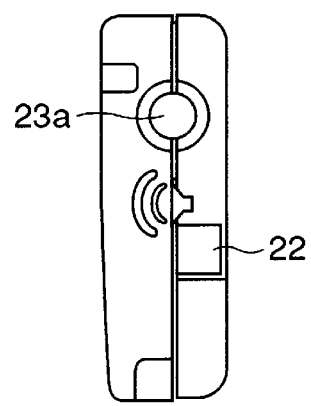

FIG. 2 illustrates the appearance of the individual selective calling receiver shown in FIG. 1. FIG. 2A is a front view and FIG. 2b is a right side elevational view.

Figure 3A:
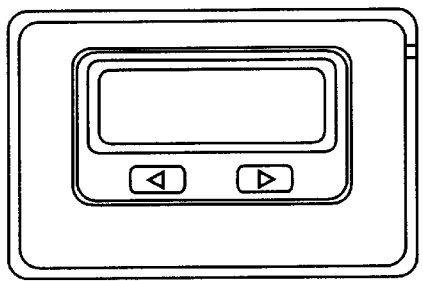
FIGS. 3A and 3B are explanatory views of a method of copy processing using two such individual selective calling receivers as shown in FIG. 1.
Figure 3B:
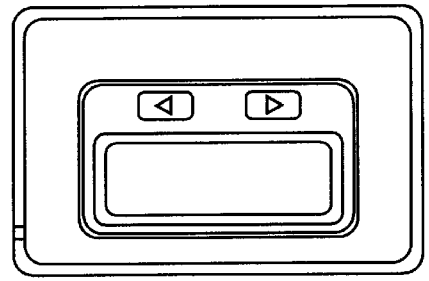

As shown in the figures, a screen 24 corresponding to the LCD 3 and a switch pressing portions 23b and 23c corresponding to the group 6 of push switches are disposed on the front face of the individual selective calling receiver. A switch pressing portion 23a corresponding to the group 6 of push switches and a window 22 for an infrared ray for outputting or detecting an infrared ray are provided on the right side face. The infrared ray outputting portion 9 and the infrared ray sensor 10 are provided in the window 22 for an infrared ray. Therefore, as shown in FIGS. 3A and 3B, when two such individual selective calling receivers are prepared and are made to be opposed to each other such that the respective windows 22 for an infrared ray on the right side faces face each other, an infrared ray signal outputted from the infrared ray outputting portion 9 of the right individual selective calling receiver can be received by the infrared ray sensor 10 of the left individual selective calling receiver, or reversely, an infrared ray signal outputted from the infrared ray outputting portion 9 of the left individual selective calling receiver can be received by the infrared ray sensor 10 of the right individual selective calling receiver.

Next, operation of the present invention is now described in the following.

The individual selective calling receiver receives an individual selective call signal from a radio base station of an individual selective calling system to which the individual selective calling receiver belongs. The radio portion 1 detects a base band signal from the individual selective call signal and sends it to the controlling portion 2. The controlling portion 2 decodes the base band signal, compares it with the ID number stored in advance in the ID-ROM 5, and judges whether the received individual selective call signal is sent to the individual selective calling receiver or not. In case the controlling portion 2 detects receipt of an individual selective call signal addressed to the individual selective calling receiver, the controlling portion 2 makes the informing portion 4 including a speaker, vibrator, or the like inform the user that there is a call. Further, a received message included in the base band signal is displayed on the LCD 3 through a predetermined operation by the user of a READ switch 13 and REVIEW switch 12 of the group 6 of push switches. In addition, the LCD 3 may be made to display a message indicating the present time, mode setting state of the individual selective calling receiver, and the like.

The individual selective calling receiver according to the present embodiment can carry out copy processing, that is, to register, in another individual selective calling receiver, an ID number or telephone number (hereinafter collectively referred to as a call number) registered in one individual selective calling receiver.

Figure 4:
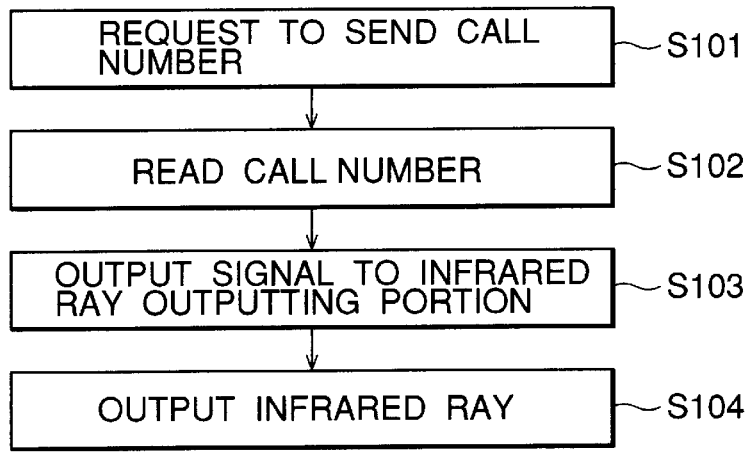
FIG. 4 is a flow chart illustrating schematically operation of an individual selective calling receiver on the side of a calling party.
Figure 5:
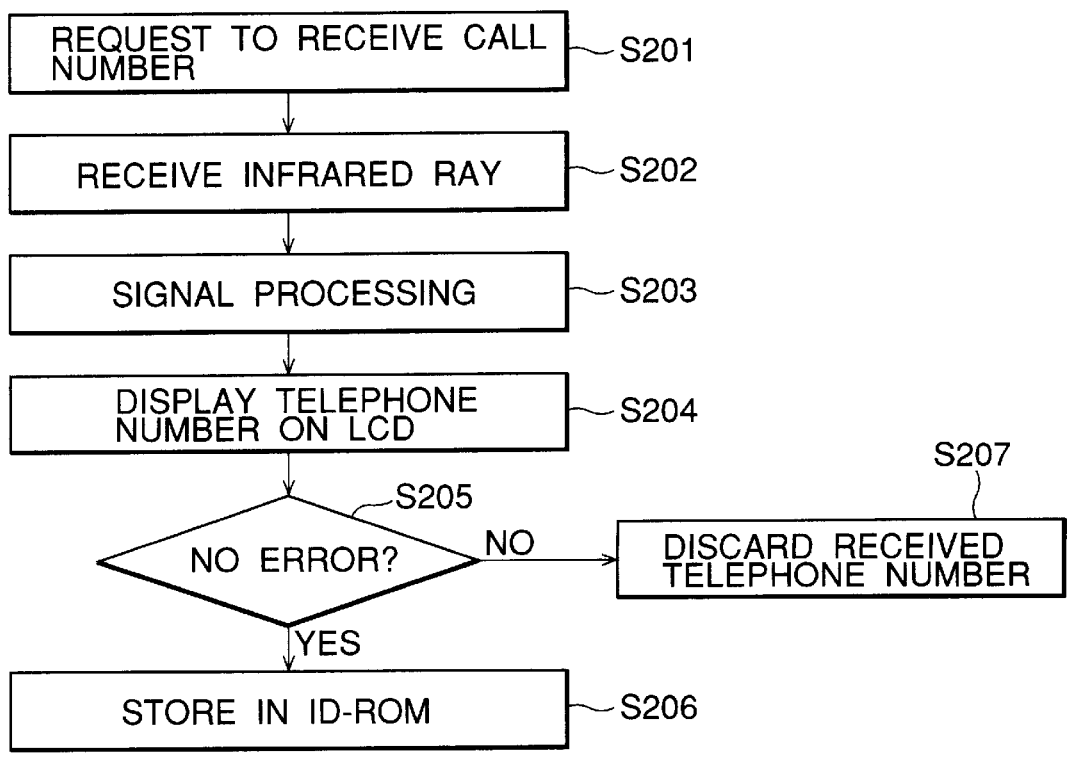
FIG. 5 is a flow chart illustrating schematically operation of an individual selective calling receiver on the side of a called party.
Figure 6:
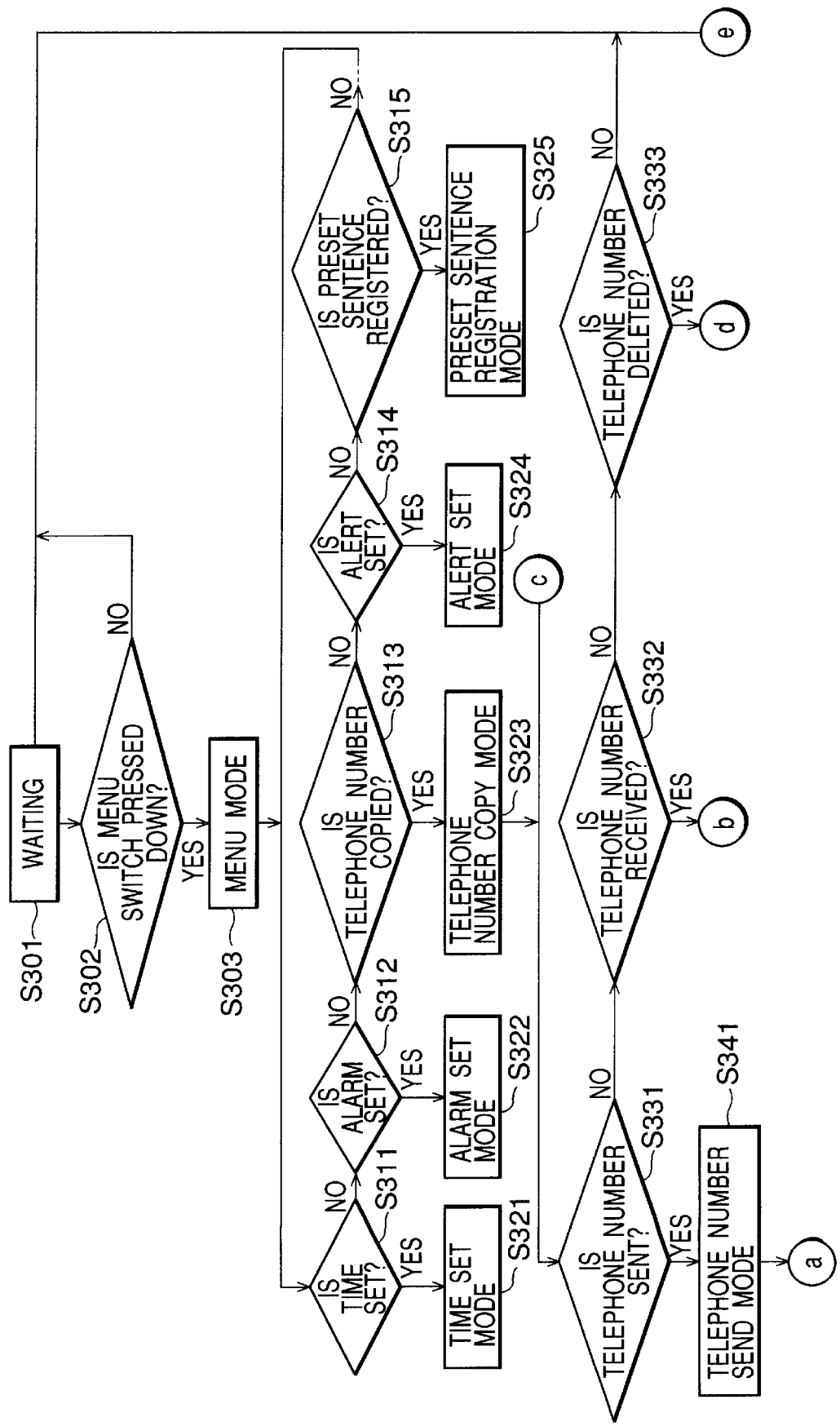
FIGS. 6 to 9 are flow charts illustrating detailed operation of an individual selective calling receiver according to the present invention.
Figure 7:
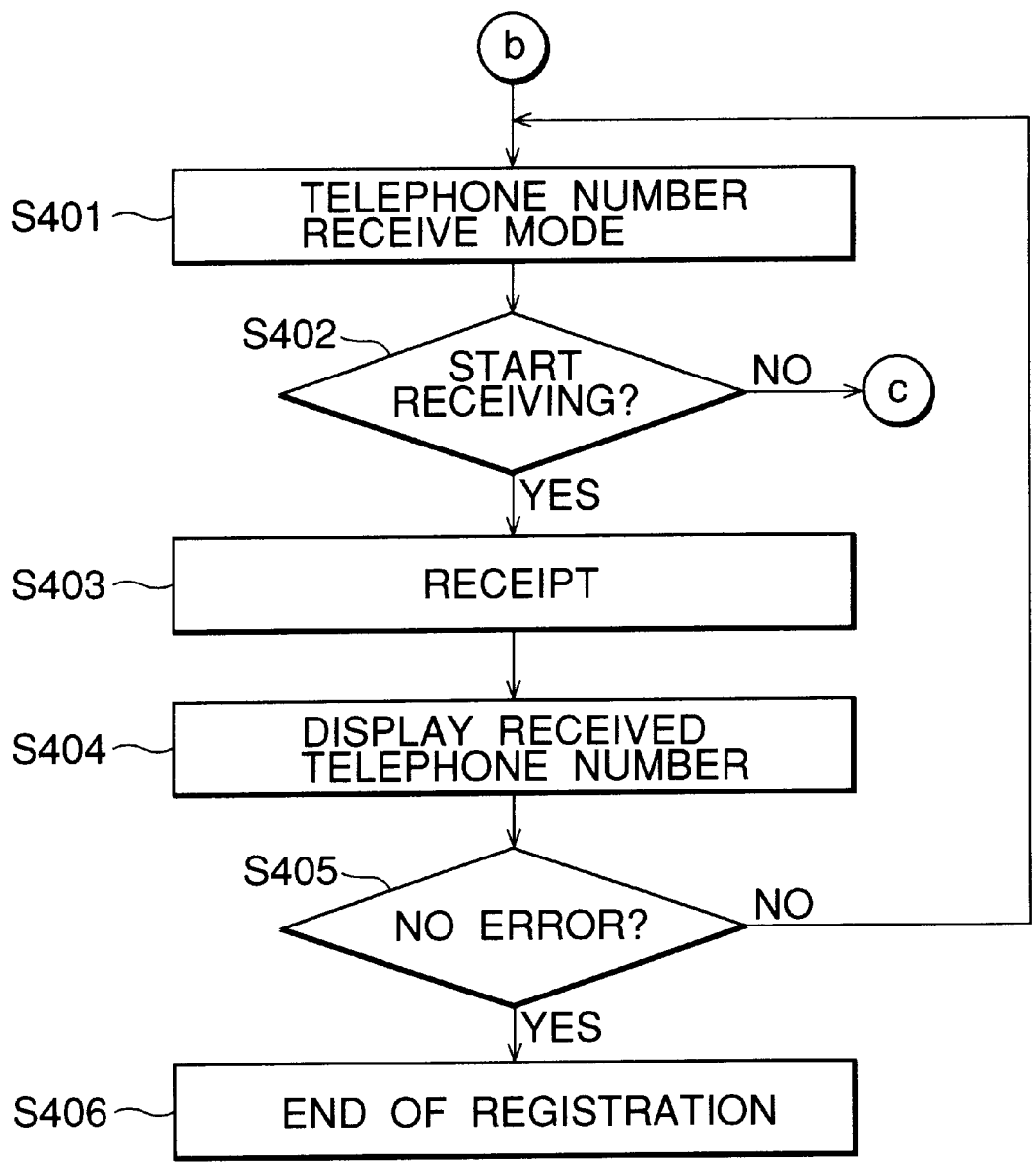
Figure 8:
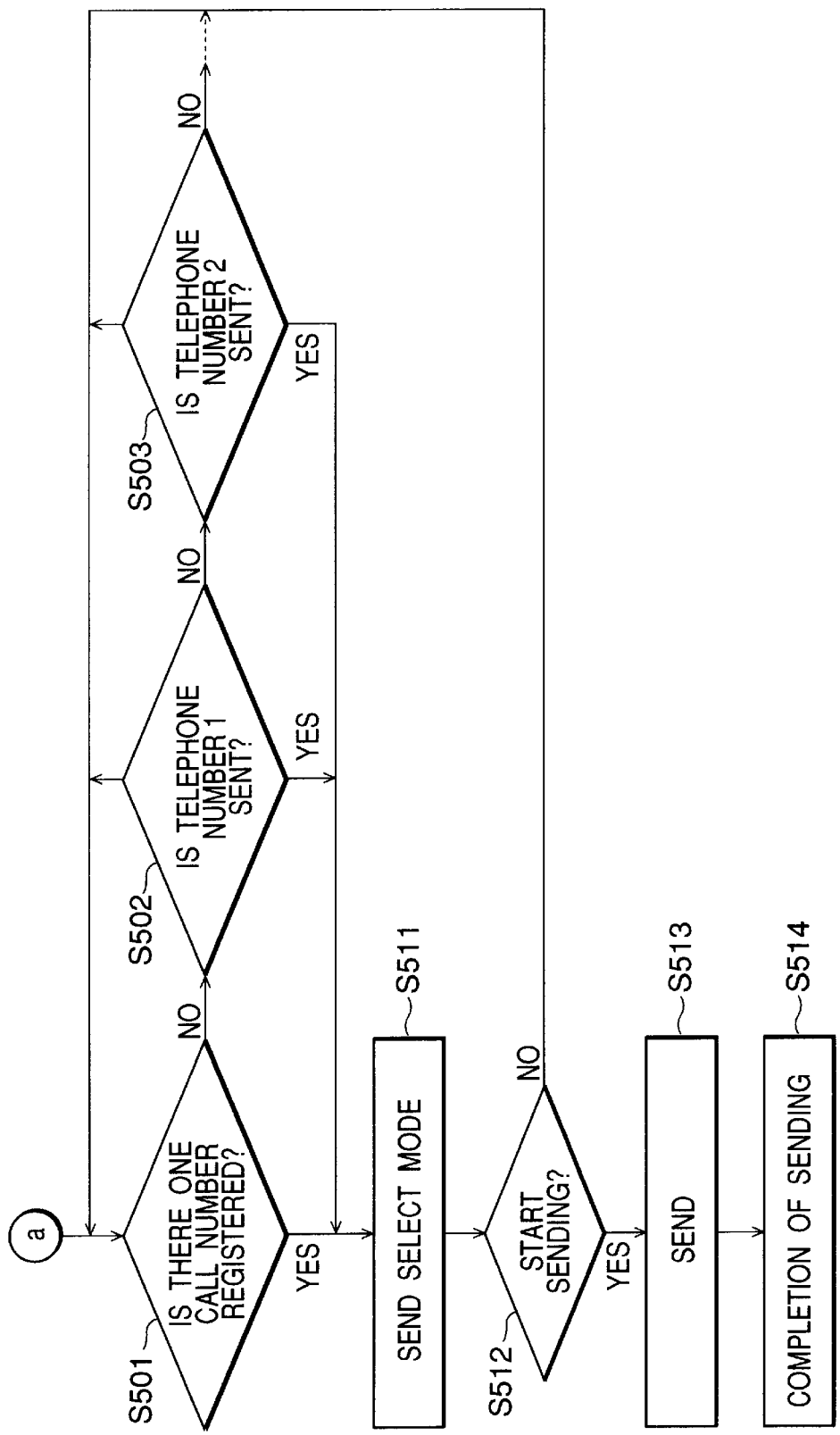
Figure 9:
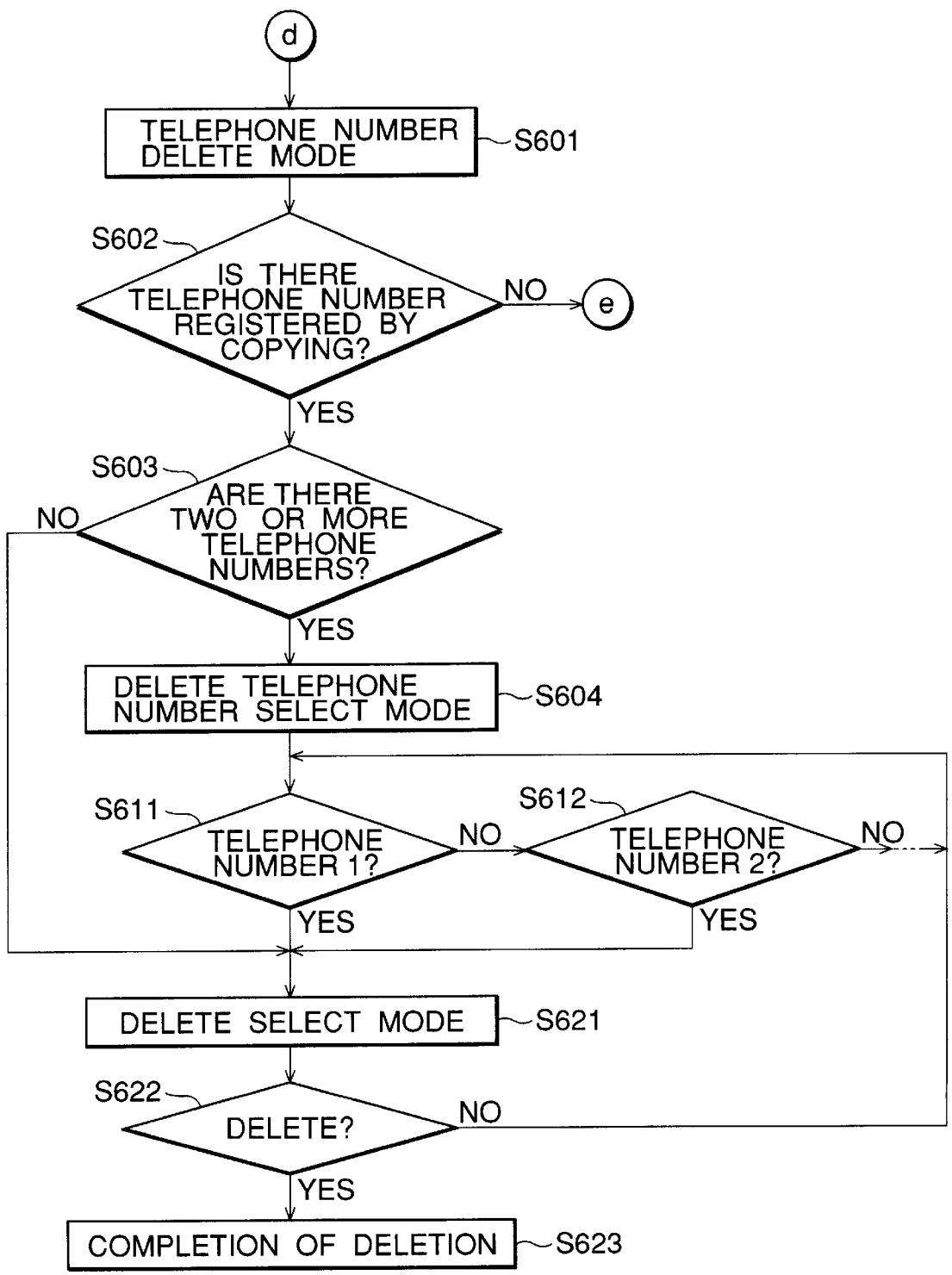

FIG. 4 is a flow chart illustrating schematically operation of an individual selective calling receiver on the side of a calling party of two individual selective calling receivers that carries out the copy processing. FIG. 5 is a flow chart illustrating schematically operation of an individual selective calling receiver on the side of a called party. The copy processing of an ID number and telephone number according to the present embodiment is now schematically described in the following with reference to these figures.

First, the user makes the two individual selective calling receivers opposed to each other as shown in FIG. 3 and carries out predetermined operation with the group 6 of push switches of the individual selective calling receiver on the side of the calling party of the two to make a request to send a call number (a step S101 in FIG. 4). The ID number reading portion 7 of the individual selective calling receiver which receives the request to send a call number reads a call number stored in advance in the ID-ROM 5 (a step S102 in FIG. 4) and sends an electric signal including the call number to the infrared ray outputting portion 9 (a step S103 in FIG. 4). The infrared ray outputting portion 9 outputs an infrared ray signal according to the electric signal received from the ID number reading portion 7 (a step S104 in FIG. 4).

On the other hand, the user carries out predetermined operation with the group 6 of push switches also with respect to the individual selective calling receiver on the side of the called party to make a request to receive a call number (a step S201 in FIG. 5).

In the individual selective calling receiver which receives the request to receive a call number, the infrared ray sensor 10 starts to detect an infrared ray signal, converts the infrared ray signal into an electric signal, and sends the electric signal to the ID number detecting portion 8 (a step S202 in FIG. 5). The ID number detecting portion 8 clips a call number from the electric signal and sends the call number to the controlling portion 2 (step S203 in FIG. 5).

Upon receipt of the call number from the ID number detecting portion 8, the controlling portion 2 displays the call number on the LCD 3 (step S204). The user confirms whether there is no error in the call number displayed on the LCD 3 or not, and inputs the result of acknowledgment that there is an error/there is no error by carrying out predetermined operation of the group 6 of push switches.

The controlling portion 2 judges whether there is an error or not in the call number by detecting the operation (step S205). If there is no error, the controlling portion 2 writes the call number received from the ID number detecting portion 8 in, among the storage region of the ID-ROM 5, a storage region different from a storage region where a call number is already stored. In this way, a call number received from another individual selective calling receiver is stored in the ID-ROM 5 in addition to the call number originally stored. If, on the other hand, the result of the judgment is that there is an error in the call number, the controlling portion 2 discards the call number received from the ID number detecting portion 8.

FIGS. 6 to 9 are flow charts illustrating a detailed control flow of the controlling portion 2 according to the present embodiment. The copy processing mentioned in the above is now described in detail with reference to these flow charts.

If a MENU switch 11 is pressed down when the individual selective calling receiver is in a waiting state for a call (step S301 in FIG. 6), the controlling portion 2 makes the operation mode a MENU mode (steps S302 and S303). In the MENU mode, menus are displayed such that the user selects one among various functions provided by the individual selective calling receiver including setting of the present time (step S321), setting of an alarm (step S322), copying of a telephone number (step S323), setting of an alert (step S324), and registering of a preset sentence (step S325), and selection by the user is taken in. More specifically, the controlling portion 2 switches the displayed message for setting a function in the order of the above functions (steps S321 to S325) every time the READ switch 13 is pressed down (steps S311 to S315).

Here, if the REVIEW switch 12 is pressed down when the TELEPHONE NUMBER COPY mode is displayed as the menu (step S313), the controlling portion 2 makes the operation mode the TELEPHONE NUMBER COPY mode (steps S313 and S323). In the TELEPHONE NUMBER COPY mode, the copy processing of a call number mentioned in the above is carried out. The user identifies a call number registered in the individual selective calling receiver by displaying the telephone number only. In more detail, the TELEPHONE NUMBER COPY mode includes three modes: a TELEPHONE NUMBER SEND mode (step S341); a TELEPHONE NUMBER RECEIVE mode (step S401 in FIG. 7); and a TELEPHONE NUMBER DELETE mode (step S601 in FIG. 9). The controlling portion 2 displays the respective menus corresponding to these modes one by one every time the READ switch 13 is pressed down (steps S331 to S333).

The controlling portion 2 selects the TELEPHONE NUMBER SEND mode, the TELEPHONE NUMBER RECEIVE mode, or the TELEPHONE NUMBER DELETE mode when the REVIEW switch 12 is pressed down during the TELEPHONE NUMBER SEND mode, the TELEPHONE NUMBER RECEIVE mode, or the TELEPHONE NUMBER DELETE mode are displayed as the menu, respectively, to shift to the selected operation mode.

In case the TELEPHONE NUMBER SEND mode is selected and the controlling portion 2 shifts to the mode, the controlling portion 2 judges whether one call number is registered in the ID-ROM 5 or not (step S501). If a plurality of call numbers are registered, telephone numbers included in the respective call numbers are displayed one by one every time the READ switch 13 is pressed down. The user continues to press down the READ switch 13 as he acknowledges the telephone numbers displayed in this way. When the telephone number he would like to copy is displayed, he presses down the REVIEW switch 12 to execute the decision. This decision makes the controlling portion 2 switch the operation mode to a SEND START SELECT mode in which whether sending is started or not is selected (steps S511 and S512). It is to be noted that, in case only one call number is registered, if the TELEPHONE NUMBER SEND mode is selected, the mode automatically shifts to the SEND START SELECT mode without display of the telephone number (steps S501, S511, and S512).

After the individual selective calling receiver on the side of the calling party is made to be in the SEND START SELECT mode, the user shifts the individual selective calling receiver on the side of the called party to the TELEPHONE NUMBER COPY mode and selects the TELEPHONE NUMBER RECEIVE mode by similar operation. As a result, the controlling portion 2 of the individual selective calling receiver on the side of the called party makes the operation mode the TELEPHONE NUMBER RECEIVE mode (step S401) and shifts to a RECEIVE START SELECT mode (step S402).

After one of the two individual selective calling receivers is made to be in the SEND START SELECT mode (step S512) and the other is made to be in the RECEIVE START SELECT mode (step S402) by the above processing, the user makes the windows 22 for an infrared ray of the respective individual selective calling receivers face each other, presses down the REVIEW switches 12 of the respective individual selective calling receivers, and instructs start of sending and start of receiving, respectively.

Consequently, the individual selective calling receiver on the side of the calling party sends the call number as an infrared ray signal under the control of the controlling portion 2 (steps S513 and S514). The individual selective calling receiver on the side of the called party receives the infrared ray signal under the control of the controlling portion 2 (step S403) and displays on the LCD 3 a telephone number included in the received call number (step S404) for confirmation whether there is no error in the telephone number (step S405). If the user selects "no error" by pressing down the REVIEW switch 12, the controlling portion 2 registers the call number in the ID-ROM 5, displays on the LCD 3 a message indicating completion of the registration (step S406), and ends the TELEPHONE NUMBER COPY mode. If, on the other hand, the user selects "error" by pressing down the READ switch 13, the controlling portion 2 displays on the LCD 3 a message indicating failure in receiving and again shifts to the TELEPHONE NUMBER RECEIVE mode (steps S405 and S401). In this case, the user once again carries out operation for copying the call number.

Next, deletion of a call number is described in the following. After the shift to the TELEPHONE NUMBER COPY mode, if the TELEPHONE NUMBER DELETE mode (step S601) is selected, the controlling portion 2 judges whether there are two or more call numbers registered by copying (not the original call number but call numbers copied from another individual selective calling receiver by the copy processing described in the above) or not (step S603). In case there are two or more call numbers, the controlling portion 2 shifts to a operation mode where a telephone number to be deleted is selected (step S604). More specifically, telephone numbers in the registered call numbers are displayed one by one every time the READ switch 13 is pressed down, and, by pressing down of the REVIEW switch 12, a call number corresponding to a telephone number displayed at that time is determined to be the object of deletion. This decision makes the controlling portion 2 shift to a DELETE SELECT mode (steps S621 and S622). It is to be noted that, in case only one call number is registered by copying, the mode automatically shifts to the DELETE SELECT mode without selecting a telephone number (steps S603, S621, and S622). In case no call number is registered by copying, the mode returns to the waiting mode.

In the DELETE SELECT mode, whether the deletion is carried out or not is selected by switch operation. If it is selected to carry out the deletion, the controlling portion 2 deletes the call number selected as the object of deletion among the call numbers in the ID-ROM 5. In case only one call number is registered by copying, that call number is deleted. If it is selected not to carry out the deletion, the mode returns to the TELEPHONE NUMBER COPY mode.

As described in the above, according to the present invention, since ID number and telephone number information can be copied or deleted among a plurality of individual selective calling receivers, a plurality of individual selective calling receivers may have the same ID. Therefore, a message can be sent to a plurality of individual selective calling receivers with call operation being carried out only once. Further, if a plurality of users have a plurality of individual selective calling receivers having the same ID with them, respectively, each user who sends a message to the others can receive his own message and can confirm the content of the message with an individual selective calling receiver of his own.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. An individual selective calling receiver comprising:

a memory means for storing a call number identifying the individual selective calling receiver;

a receiving means for selectively receiving a selective call signal that is coincident with the call number stored in said memory means;

a reading means for reading the call number from said memory means and outputting the call number as an electric signal;

an optical output means for converting the electric signal outputted from said reading means into an optical signal and outputting the optical signal;

an optical sensor for receiving from a further individual selective calling receiver a further optical signal containing a further call number identifying the further individual selective calling receiver, converting the further optical signal into a further electric signal, and outputting the further electric signal;

a detecting means for detecting the further call number from the further electric signal outputted from said optical sensor; and a means for writing in said memory means the further call number detected by said detecting means.

2. An individual selective calling receiver as claimed in claim 1, wherein said optical signal is an infrared ray.

3. An individual selective calling receiver as claimed in claim 1, wherein said memory means is an ID-ROM.

4. An individual selective calling receiver as claimed in claim 1, further comprises a deleting means for deleting, in case the further call number detected by said detecting means is coincident with the call number stored in said memory means, any one of the call numbers.

5. A method of controlling information output of an individual selective calling receiver comprising the steps of:

selectively receiving a selective call signal that is coincident with a call number identifying the individual selective calling receiver that is stored in a memory of the individual selective calling receiver;

reading the stored call number and converting the call number into an electric signal;

converting the electric signal into an optical signal and outputting the optical signal;

receiving from a further individual selective calling receiver a further optical signal containing a further call number identifying the further individual selective calling receiver, converting said received optical signal into a further electric signal;

detecting the further call number from the further electric signal; and writing in the memory the detected further call number.

* * * * *